June 1, 1965 J. E. SMITH, JR 3,187,112

AERODYNAMICALLY SUPPORTED MAGNETIC HEAD CONSTRUCTION FOR MAGNETIC DRUMS, DISCS AND THE LIKE

Filed Jan. 31, 1961 2 Sheets-Sheet 1

INVENTOR.
Joseph E. Smith, Jr.
BY
Claude A. Patalidis
ATTORNEY.

INVENTOR.
Joseph E. Smith, Jr.
BY
Claude A. Patalidis
ATTORNEY.

United States Patent Office 3,187,112
Patented June 1, 1965

3,187,112

AERODYNAMICALLY SUPPORTED MAGNETIC HEAD CONSTRUCTION FOR MAGNETIC DRUMS, DISCS AND THE LIKE

Joseph E. Smith, Jr., Birmingham, Mich., assignor to Ex-Cell-O Corporation, Detroit, Mich., a corporation of Michigan Filed Jan. 31, 1961, Ser. No. 86,198
7 Claims. (Cl. 179—100.2)

This invention relates generally to magnetic recording apparatus, and more specifically to an improved means of locating magnetic transducer heads a predetermined distance away from a rapidly moving magnetizable recording surface. The device is particularly, although not exclusively, adapted for use in combination with magnetic drums or discs commonly used as memory storage devices in computing machines and the like.

In magnetic storage devices of the type which have a rapidly moving record body with a magnetizable surface layer and with one or several magnetic transducer heads, it is necessary to establish an air-gap spacing between the tip of each transducer head and the surface of the record medium as narrow as practically feasible, in order to permit sufficient density of recording of bits of intelligence, satisfactory balance of playback intensity and less spreading of the recorded pulses to the adjoining tracks. In other words, the quality of the recorded information is inversely proportional to the distance between the tip of the transducer head and the surface of the recording medium, and some magnetic data storage devices utilize an air-gap spacing of less than a fraction of a thousandth of an inch.

This desired predetermined air-gap spacing must be maintained constant in operation to achieve a satisfactory and constant signal level during recording and readout. Eccentricity, wobble, vibration and runout of rotary parts such as the record medium, as well as thermal expansion and expansion of the magnetic drum due to centrifugal forces have caused great difficulties in establishing and maintaining the desired air-gap spacing during dynamic conditions.

In co-pending applications of George D. Cheney, Serial No. 37,688, and Joseph E. Smith, Jr., Serial No. 772,861, both assigned to the assignee of the present invention, there are disclosed automatic air-gap spacing arrangements for magnetic transducer heads utilizing the hydrodynamic forces that are present during the operation of the devices and having no external control medium for establishing and maintaining the required air-gap spacing. The subject invention is also utilizing hydrodynamic forces, one of its objects being to establish a predetermined close gap positioning of a magnetic transducer head in relation to the magnetizable surface of a rapidly moving recording medium.

Another object of the present invention is to maintain this predetermined air-gap spacing without any risk of the transducer head ever contacting the recording surface and the attendant possibility of damaging or even destroying the transducer head or the recording medium, or both.

Another object of the present invention is to control the air-gap spacing by means of balancing the forces acting simultaneously upon the transducer head and upon the transducer head supporting members.

A further object of this invention is to maintain the air-gap spacing constant in operation, irrespective of any eccentricity, wobble or runout of the moving recording medium.

A further object of this invention is to make the precise air-gap spacing remain automatically constant, in spite of thermal expansion and expansion due to centrifugal forces acting upon a rapidly rotating recording medium.

Still a further object of the invention is to make a magnetic transducer head of very low inertia and practically immune to vibrations.

Another object of this invention is to cause the magnetic transducer head to retract to a "fail-safe" position when the magnetizable surface becomes stationary in relation to the transducer head, or as soon as the velocity of the magnetizable surface becomes lower than a predetermined value.

It is another object of the invention to construct a transducer head positioning device in relation to the recording surface utilizing other hydrodynamic forces in addition to the forces due to the so-called "Bernoulli effect."

An additional object of the present invention is to construct a magnetic transducer head in such a way as to cause it to ride upon a gas fluid bearing while in operation.

Another object of the invention is to construct a magnetic transducer head which is light, simple and inexpensive to manufacture and operate, while being at the same time very rugged and reliable in operation.

It is an additional object of the invention to construct a magnetic transducer head which is adaptable to be used in combination with simple and rugged mounting block elements, such as are described and claimed in the co-pending applications of George D. Cheney, Serial No. 37,688, and James P. Casey et al., Serial No. 70,043, both assigned to the assignee of the present invention.

Other objects and advantages of the present invention will be apparent from the following detailed description and claims taken in connection with the accompanying drawings which disclose, by way of example, the principles of this invention and the best mode as well as several modifications which exemplify diverse ways of utilizing these principles.

Briefly stated, the present invention contemplates providing a shoe-like pad containing a magnetic transducer head which is adjustably mounted upon an appropriate mounting block element, not part of this invention. The transducer pad is normally biased by reed-like leaf springs to a position away from the surface of a record medium when the latter is at rest. The transducer head may be one of several associated with a movable record storage medium such as a magnetic drum, a magnetic disc, or the like. During dynamic conditions when the drum, or the disc, is rotating, a laminar boundary layer of gas or air clinging to the surface of the recording medium is forced to rotate at a velocity sensibly equal to the rotational velocity of the record surface. This rapidly moving layer of gas or air fluid acts upon the shoe-like transducer head pad as will be explained later, in such ways as to exert upon the pad forces that are overcoming the biasing action of the reedlike supporting leaf springs. The shoe-like pad approaches the recording surface until it is supported by a laminar layer film of gas or air.

At this point, the forces are balanced and the pad maintains a stable position in very close relationship to the surface of the record medium which is ideal for maximum recording and readout performance. This predetermined air-gap will remain constant during adverse conditions of wobble, runout, expansion, etc. If, for any reasons, the record medium ceases to rotate at a proper velocity, the pad will automatically retract to a "fail-safe" position, under the biasing action of the supporting leaf springs.

Figures 1, 2:
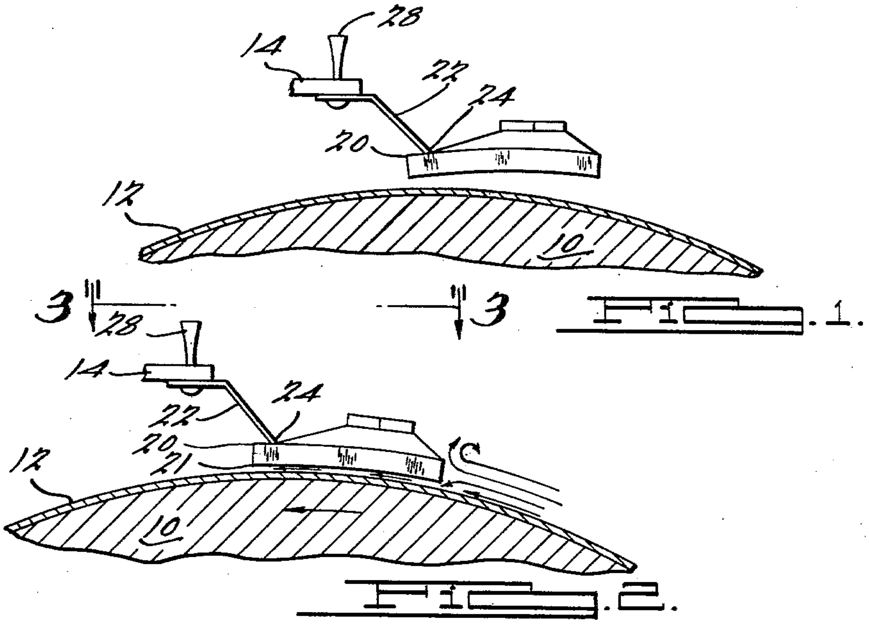
FIG. 1 is an elevation view, partly in section, showing a portion of a rotatable magnetizable record medium and a magnetic transducer head assembly associated therewith, when the device is in a static condition.
FIG. 2 is an elevation view, partly in section, showing the component parts when the device is in a dynamic condition, i.e., when the record medium is rotating.

Referring to the drawings, in FIGS. 1 and 2 there is shown a drum record medium 10 having a magnetizable surface layer 12 and a transducer head support bar insulator 14 spaced therefrom. The support bar insulator 14 is fastened to a mounting bar or block (not shown) which in turn is adjustably mounted upon an appropriate housing enclosing the apparatus and maintaining a fixed spacial relationship in regard to the record medium 10.

The transducer head has a core 16 (FIGS. 3 and 4) and a winding coil 18 associated therewith in the normal manner. The core-coil assembly is encased in a cast shoe-like pad 20 which is made of a non-conductive material and could, for example, be a plastic resin of the epoxy class.

The pad 20 is supported in spacial relationship from its support bar insulator 14 by a pair of angled reed-like flat leaf springs 22 and 22'. The flat springs 22–22' are made of a metal or metal alloy which is both resilient and a good conductor of electricity, such as stainless steel shim stock, copper-beryllium bronze or the like.

Figure 3:
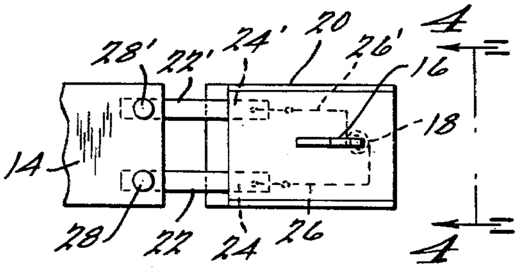
FIG. 3 is a top plan view of the magnetic transducer head assembly shown in FIGS. 1 and 2, seen from line 3—3 of FIG. 2.
Figure 4:
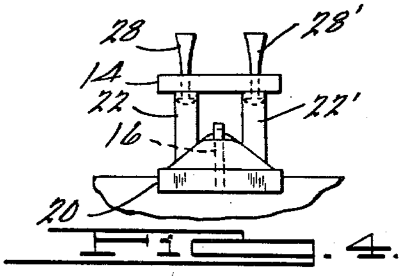
FIG. 4 is a front elevation view of the same magnetic transducer head assembly seen from line 4—4 of FIG. 3.

The ends 24–24' of the leaf springs 22–22' enter the pad 20 as shown in FIGS. 1–3, and are cemented or imbedded in the material forming the pad 20. Wires 26–26' (FIG. 3) connect the coil 18 to the leaf springs 22–22'. The other ends of the leaf springs are fastened to the support bar insulator 14, for example by means of the taper pin electrical connectors 28–28'.

FIG. 1 shows the invention in a static condition. When the drum 10 starts to rotate counter-clockwise, the gas or air near the surface of the drum tends to move with the surface. The gap between the transducer pad 20 and the surface of the drum is less than the thickness of the rapidly moving laminar layer of gas or air. As the velocity of the layer of gas or air increases, it imposes upon the transducer pad a frictional force and also a flat plate effect or force where it impinges upon the leading edge of the transducer pad. The effect of these forces is resisted by the rigid support insulator bar 14 and causes the leaf springs 22–22' to flex, thereby deflecting the transducer pad towards the rotating surface of the drum. The transducer pad then occupies a position as shown in FIG. 2 and floats on the laminar layer of gas or air being created by the fluid rushing under the underside of the transducer pad. The laminar layer prevents further movement of the transducer pad towards the surface of the drum and the pad maintains a very close and stable relationship to the surface of the drum, irrespective of any wobble, eccentricity, runout or expansion of the drum.

Figure 5:
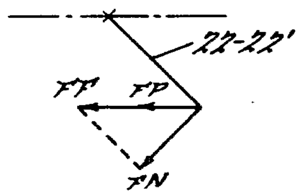
FIG. 5 is a schematic diagram of the forces acting upon the transducer head assembly of FIGS. 1 to 4, when the record medium is beginning to rotate and the transducer head is still away from the record medium.
Figure 6:
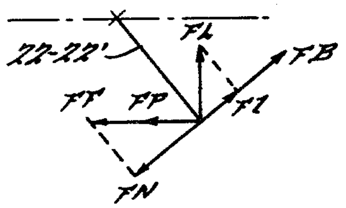
FIG. 6 is a schematic diagram of the forces acting upon the transducer head assembly of FIGS. 1 to 4 when the device is in a dynamic condition.

FIGS. 5 and 6 explain diagrammatically how the forces exerted upon the transducer pad act to deflect the free ends of the leaf springs 22–22' until a position of equilibrium for the transducer pad is reached. Vector FF represents the frictional drag force exerted by the gas or air rushing past the transducer pad. Vector FP represents the face plate force of the gas or air impinging upon the leading edge of the transducer pad. FN is the resultant force, normal to the plane of the leaf springs 22–22', when they occupy the position of FIG. 5 corresponding to the condition represented in FIG. 1.

The force FN causes a deflection of the springs 22–22' until they occupy the position shown in FIG. 6, corresponding to the dynamic condition represented in FIG. 2, at which time the forces acting upon the free ends of the springs 22–22' are in a state of equilibrium. At this point the forces acting upon the free end of the springs are in addition of the forces FF and FP: a force due to the existence of the laminar layer of gas or air acting upon the underside of the transducer pad and represented by vector FL in FIG. 6 and a biasing force, represented by vector FB, due to the flexion of springs 22–22'. The sum of FB and F1, the latter being the projection of FL on a line normal to the plane of springs 22–22', is equal to and applied in a direction opposite to FN, resulting in a state of equilibrium for the device.

With the proper angle and degree of flexibility in the supporting leaf springs, the curvature of the underside 21 of the transducer pad alines itself to the rotating surface of the drum (FIG. 2).

It can be seen by the above explanation of the principles involved in the operation of the invention that the well-known so-called "Bernoulli effect" is not depended upon to move the transducer pad into operating position. The "Bernoulli effect," which is the resultant force of the difference between the ambient atmospheric pressure and the reduced pressure under the transducer pad, is of secondary importance in the invention and may not add up to much, if anything, in comparison to the frictional and face plate forces. Any force due to the "Bernoulli effect" and which could cooperate in the invention with the frictional and face plate forces would be included in the resultant force vector FN of FIGS. 5 and 6.

Figure 7:
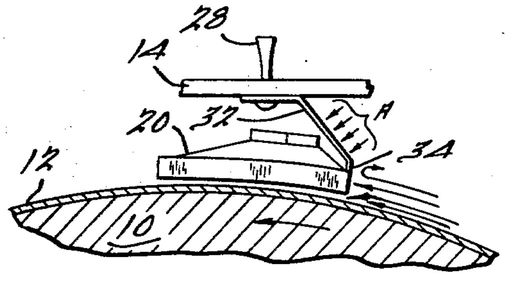
FIG. 7 is an elevation view, partly in section, showing a modification of a transducer head assembly utilizing the principles of this invention when the device is in a dynamic condition.

FIG. 7 illustrates, in a dynamic state, a modification of the invention having a transducer pad 20 supported by a pair of reed-like leaf springs 32—32. Instead of being fastened to the transducer pad 20 at a point close to its trailing edge as illustrated in the preceding embodiment of the invention, the leaf springs are fastened to a point 34 proximate the leading edge of the transducer pad 20. In this modification the forces acting upon the transducer pad are the same ones as in FIGS. 1–5, with an added force acting upon the leaf springs 32—32 which is due to the stream of air impinging upon the front of the leaf springs as indicated at A.

Figure 8:
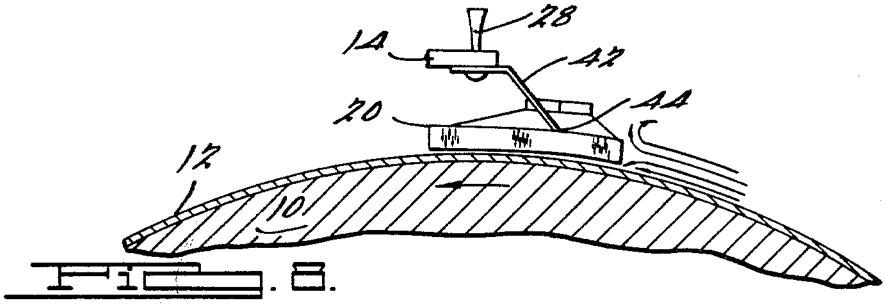
FIG. 8 is an elevation view, partly in section, of still another modification, when the device is in a dynamic condition.

FIG. 8 illustrates another embodiment of the invention where the principal difference is in fastening the leaf springs 42—42 to points 44—44 substantially in line with the center of gravity of the transducer pad 20.

Figure 9:
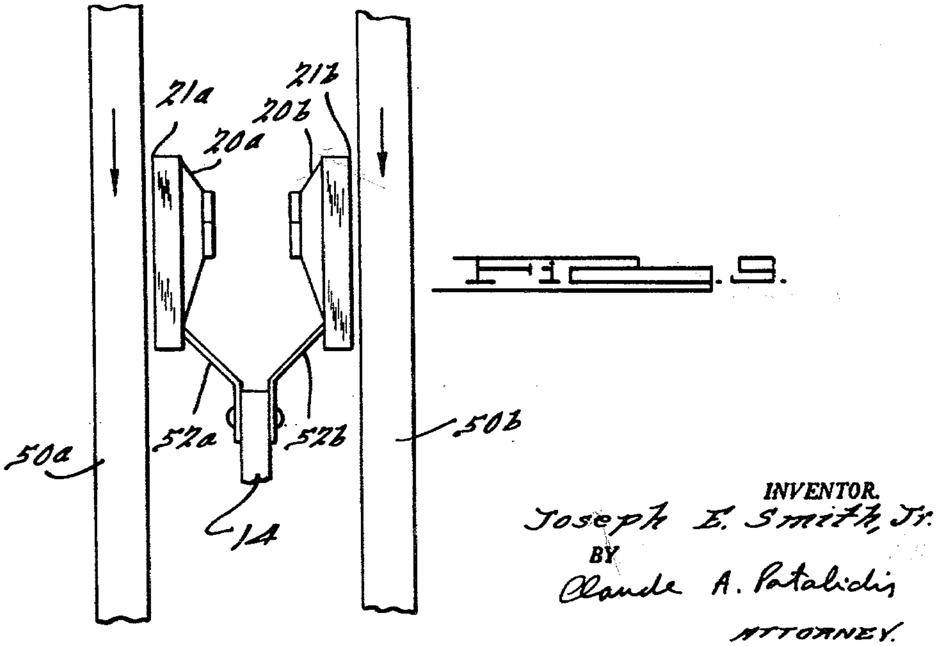
FIG. 9 is an elevation view of a device utilized in a magnetic data storage apparatus using flat magnetizable surfaces such as discs and the like, and represented in a dynamic condition.

FIG. 9 illustrates one modification of the invention, during dynamic conditions, showing how the transducer pad can be adapted to coact with flat recording surfaces such as discs and the like. **50*a*–50*b* represent a pair of such discs. Transducer pads 20*a*–20*b* have their underfaces 21*a*–21*b* flat instead of curved as in the preceding embodiments of FIGS. 1–8. The transducer pads are supported away from the support bar insulator 14 by a pair of angled leaf springs 52*a*—52*a* and 52*b*—52*b***. The principles and operation of this modification of the invention are the same as in the embodiments of FIGS. 1–8.

In all the embodiments herein shown, as soon as the rapidly moving recording surface slows down below a certain peripheral velocity, both the frictional force and the face plate force exerted upon the transducer pad cease, and, due to the biasing action of the supporting leaf springs away from the recording surface, the pad is automatically retracted to its "fail-safe" position away from the recording surface. This is a very important feature of the invention as it insures that at no time is there any possibility for the underside of the transducer pad to contact the recording surface. The pad is either away from the recording surface when the apparatus is not operating, or riding on a layer of laminar gas or air film when the apparatus is operating.

It should be understood that the transducer pad bottom surface has been illustrated as being an unbroken surface, because it has been found by experimentation that such a surface will work perfectly. However, the bottom surface could consist of two lands having a step surface between, as is the subject matter of co-pending application of George D. Cheney, Serial No. 37,688, or of any combinations and arrangements of lands and step surfaces, without departing from the scope and spirit of the present invention. It is also to be understood that although the transducer pad has been illustrated as being rectangular in plane projection (as shown in FIG. 3) for the sake of convenience, a circular, a partially circular, an oval shaped pad, or a pad of whatever shape would be encompassed within the spirit and scope of the present invention.

It is obvious that various changes may be made in details within the scope and spirit of the invention and it is therefore to be understood that the invention is not to be limited to the specific details shown and described.

What is claimed is:

1. In a magnetic recording apparatus comprising at least one magnetic transducer head adapted to record and to read magnetic pulses recorded upon the magnetizable surface of a substantially fast moving record medium, an improved device for automatically establishing and maintaining a narrow air-gap spacing between the pole tip of the transducer head and the magnetizable record medium, said device comprising a molded shoe-like pad casing for the said transducer head and having a substantially unbroken underside surface, means supporting the said pad casing in spatial relationship with a support bar insulator adjustably mounted on the housing of the said recording apparatus, said supporting means being a pair of angled substantially parallel reed-like flat resilient metal members having one of their ends fastened to the said support bar insulator and their other ends, fastened to the said pad casing, said supporting means normally biasing the said pad casing away from the surface of the record medium while still maintaining the said pad casing in the stream of gas or air clinging to and in motion with the surface of the said record medium thereby causing the said stream of gas or air to induce hydrodynamic forces which normally oppose the said biasing means and bring the underside of the said pad casing into a predetermined closed air-gap spacing with the surface of the said record medium and to cause the underside of the said pad casing to be supported upon a laminar layer cushion of the said stream of gas or air, the said supporting means being electrically connected to the magnetic coil of the said transducer head and automatically retracting the said pad casing to a "fail-safe" retracted position as soon as the velocity of the record medium decreases below a predetermined value.

2. The device claimed in claim 1 wherein the hydrodynamic forces comprise a face plate force due to the action of the stream of gas or air impinging upon the leading edge of the said pad casing, the drag force of the frictional action of the said stream upon the surface skin of the said pad casing, the force due to the drop of ambient atmospheric pressure between the underside of the said pad casing and the surface of the said record medium and the force due to the stream of air or gas impinging upon the face of the said angled flat resilient supporting members.

3. The device claimed in claim 1 in which the angled flat resilient supporting members have one end fastened to the trailing edge of the said pad casing.

4. The device claimed in claim 1 in which the angled flat resilient supporting members have one end fastened to the leading edge of the said pad casing.

5. The device claimed in claim 1 in which the angled flat resilient supporting members have one end fastened to a position intermediate the trailing and leading edges of the said pad casing.

6. In a magnetic recording apparatus comprising at least one magnetic transducer head adapted to record and to read magnetic pulses recorded upon the magnetizable surface of a substantially rapidly moving record medium, an improved device for automatically establishing and maintaining a narrow gap spacing between the pole tip of the transducer head and the magnetizable record medium, said device comprising a molded shoe-like pad rigidly encasing said transducer head, said pad being provided with a fluid bearing surface disposed alongside the surface of said record medium, means supporting said pad in spatial relationship with a support adjustably mounted on the housing of said recording apparatus, said supporting means being solely a pair of angled substantially parallel reed-like flat resilient springs having one of their ends fastened to said support and their other ends fastened to said pad, said supporting means normally biasing said pad away from the surface of the record medium while still maintaining said pad in the stream of fluid clinging to and in motion with the surface of said record medium thereby causing said stream of fluid to induce hydrodynamic forces which normally oppose said biasing means and bring the fluid bearing surface of said pad into a predetermined close gap spacing with the surface of said record medium and to cause the fluid bearing surface of said pad to be supported upon a laminar layer cushion of said stream of fluid, said supporting means automatically retracting said pad to a "fail-safe" retracted position as soon as the velocity of the record medium decreases below a predetermined value.

7. The device of claim 6 wherein the angled reed-like flat springs are disposed in the stream of fluid, thereby causing said stream to impinge upon said flat leaf springs so as to create an additional hydrodynamic force for urging the fluid bearing surface of the pad into close proximity to the surface of the record medium.

References Cited by the Examiner

UNITED STATES PATENTS

| | | | |
|---|---|---|---|
| 2,863,004 | 12/58 | Maclay | 179—100.2 |
| 2,937,240 | 5/60 | Harker | 179—100.2 |
| 2,972,738 | 2/61 | Sliter | 179—100.2 |
| 3,065,460 | 11/62 | Altenau et al. | 179—100.2 |

BERNARD KONICK, *Acting Primary Examiner.*

DAVID G. REDINBAUGH, IRVING L. SRAGOW, *Examiners.*